Figure 3:
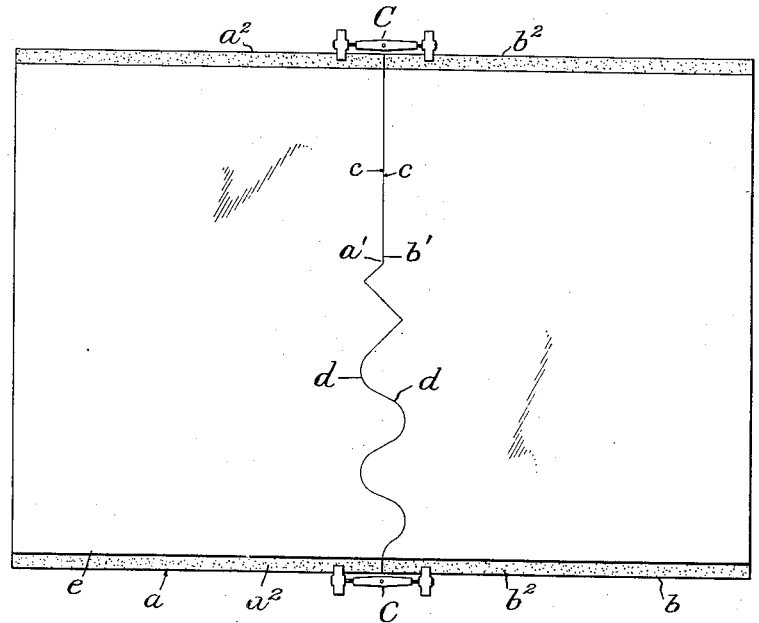

April 17, 1928.  1,666,252

L. BARTELSTONE

METHOD OF SPLICE LAMINATING GLASS

Filed July 27, 1926

Inventor
Louis Bartelstone
By Attorney
Albert F. Nathan

Patented Apr. 17, 1928.

1,666,252

UNITED STATES PATENT OFFICE.

LOUIS BARTELSTONE, OF FLATBUSH, NEW YORK.

METHOD OF SPLICE-LAMINATING GLASS.

Application filed July 27, 1926. Serial No. 125,211.

This invention relates to a method of and an apparatus for splice-laminating glass.

Laminated glass consists of outer plates of glass and an intervening sheet, or sheets, of celluloid, or other non-brittle substance, all securely held together by adhesion.

In the manufacture of this product, the faces of the glass to be united to the intervening sheet or sheets are coated with a suitable fluid which will effect a union of the laminæ. They are then assembled and subjected to pressure which serves to expel the uniting fluid in a manner such as will effect a permanent union between the flexible and comparatively stiff plates. The lamination must be so done that the adhesion shall be continuous and uniform and there must be no spots or regions of an optically imperfect appearance.

Usually the glass plates and a single intervening sheet are initially cut to substantially the same shape and size so that when the laminating process is completed the intervening sheet is wholly invisible except at the very edges of the product. Inasmuch as the celluloid is used merely to strengthen and bind together the glass, thereby to keep it from shattering, when broken, visibility of the celluloid is neither required nor desired and the above-noted practice is ideal.

It is, however, sometimes desired to laminate sheets of glass larger than any available single sheet of celluloid and to do this it has heretofore been the practice, first to cement together, or otherwise join, two or more sheets of celluloid to equal in size the glass to be united. This initial joining of the plurality of sheets has been necessary due to the fact that, unless so joined, during the locating of the laminæ in the press and during the application of pressure thereon, one sheet would move relative to the other and thereby leave a slight space between the adjacent edges of the intervening sheets. This lack of continuity of the celluloid would result in a defective and unsightly product which is not acceptable to the trade.

It is, of course, essential that this seam be as inconspicuous as possible and that a multiplicity of thickness be avoided, therefore a butt seam is most satisfactory and most desirable.

This invention has for an object to overcome the inherent defects and undesirable features of prior methods of splice-laminating glass and it proposes a new method of, and apparatus for, performing that operation without the necessity of initially joining the celluloid sheets.

This new method consists in initially forming the adjacent edges of the celluloid sheets so that they will each be an exact counterpart of the other so that when their edges are subsequently brought into butt contact only a faint hair line will be visible at the juncture. These sheets are then inserted between plates of glass (which have been coated with the usual uniting fluid) and their mating edges are brought into abutting relation so as to effect a substantially continuous sheet; only the faintest line being perceptible at their meeting edges. The two sheets are then secured against relative movement and the assembled glass plates and the spliced sheets of celluloid are inserted within the usual power press which serves to expel the uniting fluid and to effect a permanent union between the glass plates and the intervening spliced sheets of celluloid.

It is to be understood that this new method includes the positive holding of the celluloid sheets against relative movement during the pressing operation, whereby they are prevented from moving with the expulsion of the fluid as they did in prior processes unless they had been previously united, as hereinbefore described.

Figure 2:
Figure 1:
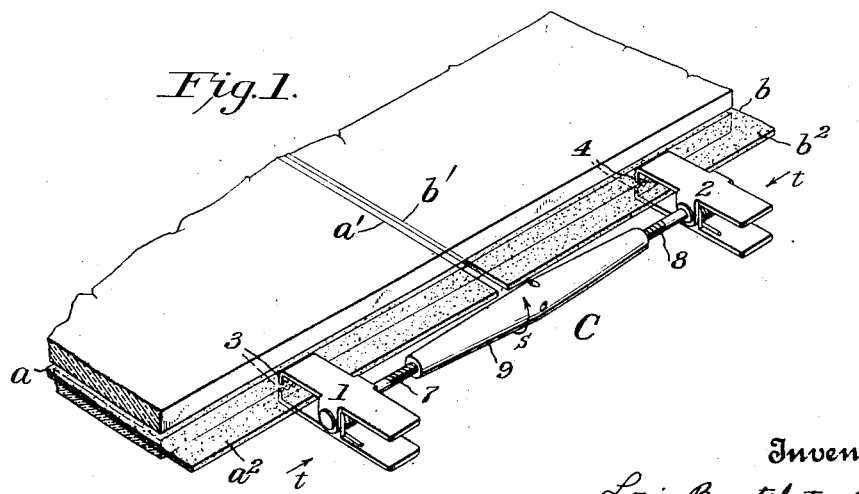

An apparatus adapted to carry out this new and improved method is disclosed in the annexed drawings of which Fig. 1 is a view, in perspective, of a device adapted to draw the adjacent edges of the two celluloid sheets into abutting relation and to maintain the sheets against movement during the pressing of the laminæ. Fig. 2 is a side view thereof. Fig. 3 is a view in plan of a completely assembled spliced-glass "sandwich" comprising the outer plates of glass and the intervening sheets of celluloid with their counterpart adjacent edges accurately fitted together and held against relative movement by clamps later to be described.

This new method consists in forming sheets $a$ and $b$ of celluloid, or other non-brittle substance with counterpart edges $a'$ and $b'$, respectively. As shown in Fig. 3, these edges may either be straight, as at $c$, or they may be irregular as shown at $d$. These sheets are then placed between suitably prepared plates of glass $e$ and $f$ with their adjacent marginal portions projecting beyond the edges of the glass. Suitable clamps C are then secured, at their opposite ends, to the projecting marginal portions of the sheets *a* and *b* and, by adjustment of these clamps, the mating edges (if not already in contact) are drawn tightly together so that the juncture appears as but a fine hair line. This completely assembled unit, comprising the outer sheets of glass and the intervening spliced sheet of celluloid, is then subjected to pressure in the usual manner, to effect a complete union of the laminæ.

Any suitable clamp may be utilized to draw the sheets *a* and *b* forcibly into abutting contact and to hold them in that position after they have been so assembled. The clamp illustrated in the drawings comprises self-closing sheet gripping-members 1 and 2 provided with roughened gripping jaws 3 and 4, respectively, which are forced into contact with the sheets by coil springs 5 and 6. These sheet-gripping members are secured upon right and left threaded pins 7 and 8 threaded into the opposite ends of a turn-buckle 9. It will readily be perceived that after the members 1 and 2 have gripped the sheets *a* and *b*, rotation of the turn-buckle in the direction of the arrow *s* will cause the gripping members to be moved toward each other in the direction of the arrows *t* thereby drawing the edges *a'* and *b'* together where they will be held during subsequent handling of the laminæ.

From the foregoing it will be perceived that this invention has provided a new and improved method of splice laminating glass in a single pressing operation and without first uniting the two or more sheets of celluloid.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. The method of splice-laminating glass which consists in forming an edge of each of two sheets of non-brittle material so that said edges are counter-parts; placing the counterpart edges in abutting contact; placing these abutted sheets between plates of glass; holding the abutted sheets against relative movement, and applying pressure upon the glass plates to effect cohesion between the glass and the two intervening sheets.

2. The method of splice-laminating glass which consists in placing two sheets of non-brittle material upon a plate of glass with a marginal portion of each of said sheets projecting beyond an edge of the glass plate; bringing the edges of said sheets into abutting contact; securing the projecting marginal portions against relative movement; placing another plate of glass upon the two connected sheets; and applying pressure upon said plates to effect cohesion between the two glass plates and the two intervening sheets.

3. The method of splice-laminating glass which consists in placing two sheets of non-brittle material upon a glass plate with opposite marginal portion of the sheets projecting beyond opposite edges of said glass plate; placing the adjacent edges of said sheets into abutting contact; placing clamping devices on the projecting marginal portions of the sheets to hold them against relative movement; placing another plate of glass on the two connected sheets and applying pressure upon said plates to effect cohesion between the plates and the non-brittle sheets.

4. The method of splice-laminating glass which consists in forming an edge of each of two sheets of non-brittle material so that said edges are counterparts; placing sheet-gripping elements upon each of said sheets at opposite edges thereof; adjusting the pair of gripping elements at each edge of the sheets toward each other to draw the counterpart edges into abutting contact; placing said two abutted sheets between plates of glass, with the marginal portions to which the gripping elements are attached projecting beyond the edges of said plates; and then applying pressure upon said plates to effect cohesion between the glass plates and the spliced intervening sheets.

In witness whereof, I have hereunto subscribed my name.

LOUIS BARTELSTONE.